(12) United States Patent
Hong et al.

(10) Patent No.: US 6,614,487 B2
(45) Date of Patent: Sep. 2, 2003

(54) APPARATUS AND METHOD FOR DETECTING SYNCHRONIZING SIGNAL OF DIGITAL TV

(75) Inventors: Sung Ryong Hong, Kyonggi-do (KR); Young Mo Gu, Seoul (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 09/758,422

(22) Filed: Jan. 12, 2001

(65) Prior Publication Data

US 2001/0007476 A1 Jul. 12, 2001

(30) Foreign Application Priority Data

Jan. 12, 2000 (KR) .......................................... 2000-1416

(51) Int. Cl.[7] .............................................. H04N 5/06
(52) U.S. Cl. ..................... 348/500; 348/521; 348/524
(58) Field of Search ................................ 348/500, 521, 348/524, 525, 512, 513, 516, 529, 533; 375/362, 364, 365, 366, 367, 368, 369; H04N 5/06

(56) References Cited

U.S. PATENT DOCUMENTS 5,877,816 A * 3/1999 Kim ............................ 348/526

6,504,578 B1 * 1/2003 Gu ............................. 348/521

* cited by examiner

Primary Examiner—Sherrie Hsia
(74) Attorney, Agent, or Firm—Birch, Stewart, Kolasch & Birch, LLP

(57) ABSTRACT

An apparatus and method for detecting a synchronizing signal in a digital TV receiver which adopts a VSB mode is disclosed. The apparatus includes a correlation unit for obtaining a correlation value between a received signal for each unit of symbols and a preset reference field synchronizing signal, a maximum value detector for detecting a location of the symbol having a maximum correlation value while performing counting operation for a unit of a variable constant added to the number of symbols corresponding to one field, a synchronizing lock signal generator for generating a synchronizing lock signal by testing reliability of the symbol location detected by the maximum value detector, and a synchronizing location controller for calculating a relative location of the symbol location having a maximum value to generate a corresponding synchronizing signal if the synchronizing lock signal is generated by the synchronizing lock signal generator. A synchronizing pattern is traced per field in even case that channel characteristic is seriously varied. Thus, the synchronizing signals are stably restored at high speed.

20 Claims, 5 Drawing Sheets segment synchronization reset input segment synchronization field synchronization

APPARATUS AND METHOD FOR DETECTING SYNCHRONIZING SIGNAL OF DIGITAL TV

BACKGROUND OF THE INVENTION

1. Field of the Invention

The present invention relates to a digital TV receiver which adopts a vestigial side band (VSB) mode, and more particularly to an apparatus and method for detecting a synchronizing signal in even case that channel change frequently occurs.

2. Description of the Related Art

A VSB transmission mode suggested by Grand Alliance (GA) has remarkable features, such as a pilot signal, a data segment synchronizing signal, and a field synchronizing signal, than other digital TV transmission modes. These signals can be used to improve carrier recovery characteristic and timing recovery characteristic. The recovery characteristics of the synchronizing signals greatly act on performance of the overall system of the VSB mode.

A transmission party such as a broadcasting station transmits a signal through a mapper that acts to convert the signal to a desired power level. As an example, in case of 8 VSB for ground broadcasting, an output level of the mapper is one of eight symbol values (amplitude level), −168, −120, −72, −24, 24, 72, 120, and 168. The mapper forcibly inserts a segment synchronizing signal of four symbols for each unit of 828 symbols by a protocol and forcibly inserts a field synchronizing signal into a 313rd data segment location.

At this time, the protocol of the segment synchronizing signal has a logic format of 1, 0, 0, and 1. The output level of the mapper is 120 when the synchronizing signal is 1 while the output level is −120 when the synchronizing signal is 0. That is, the segment synchronizing signal is repeated with two levels per data segment.

FIG. 1 shows a frame format of VSB data including the data and the synchronizing signal. Referring to FIG. 1, one frame includes two fields while one filed includes 313 data segments. One data segment includes 832 symbols. In this case, fourth symbols of a start point in one data segment correspond to a segment synchronizing portion, and the first data segment in one field corresponds to a field synchronizing portion.

FIG. 2 shows a configuration of the field synchronizing portion.

Referring to FIG. 2, a data segment synchronization of four symbols, a PN511 sequence which is a pseudo random sequence, three PN63 sequences, and VSB mode information of 24 symbols are provided, while other 014 symbols are reserved. In other words, the PN511 sequence includes 511 pseudo random symbols. The second PN63 sequence of the PN63 sequences has an inverted symbol configuration per field, wherein '1' is inverted to '0' while '0' is inverted to '1'. Accordingly, one field may be divided into an even field and an odd field depending on polarity of the second PN63 sequence.

Therefore, in the digital TV receiver, the synchronizing signals inserted during transmission should be restored. If the synchronizing signals are detected in error, data recovery is not performed easily. This could lead to adverse effect to the overall system.

A scheme of the synchronizing signal recovery currently suggested in GA includes three portions, i.e., a segment synchronizing signal recovery portion, a field synchronizing signal recovery portion, and a synchronizing lock signal generating portion, so as to detect the segment synchronizing signals and the field synchronizing signals.

The detected synchronizing signals are used for equalization and forward error correction (FEC). The synchronization in the digital TV receiver means that the location of the segment synchronizing signals and the location of the field synchronizing signals are exactly detected in the received signals. The synchronization also includes a carrier recovery and timing recovery.

At this time, to detect the field synchronizing signals, the segment synchronizing signals should first be locked. As an example, recovery of the segment synchronizing signal is obtained by correlation of (1,0,0,1). A method for detecting the segment synchronizing signals is a pattern match method. In the pattern match method, binary data of transmitted data are compared with binary data set in advance in a receiving party (field synchronizing data equal to data inserted from the transmission party), and then a segment having the smallest difference is considered as a field synchronizing signal. In this case, the segment should be detected several times as a field synchronizing signal in the same location by a reliability counter, to be considered as a field synchronizing signal. The binary data of the transmitted data means 5~515(511 symbols) portions of all the segments (832 symbols). That is, in pattern matching, the PN511 sequence of the 832 symbols is only used considering required time in pattern matching and hardware without using all the data of the field synchronizing signal portion.

FIG. 3a is a block diagram of a field synchronizing signal detector. Referring to FIG. 3, an absolute value operation unit 102 obtains an absolute value of the binary data set by the receiving party in the same field synchronizing format as the data inserted from the transmission party, and outputs the absolute value to a subtractor 101. The subtractor 101 obtains a difference value between the transmitted binary data and the output data of the absolute value operation unit 102 and outputs the resultant value to an absolute value operation unit 103.

The absolute value operation unit 103 obtains an absolute value of the output of the subtractor 101 and outputs the absolute value to an integrated unit 104.

The integrated unit 104 is reset by the segment synchronizing signal to accumulate the output of the absolute value operation unit 103 during 1 data segment period and output the accumulated value to a minimum error segment detector 105. That is, the absolute value of the data(error) output from the subtractor 101 is integrated at a symbol interval for all periods of respective segments. The minimum error segment detector 105 detects the location of the segment having the minimum value among the outputs of the integrated unit 104 and outputs the detected value to a reliability counter 106.

The reliability counter 106 identifies whether the location of the segment detected from the minimum error segment detector 105 is repeated per field. If so, the reliability counter 106 increases its value. If not so, the reliability counter 106 decreases its value. If the value of the reliability counter 106 exceeds a predetermined threshold value, the reliability counter 106 generates a field synchronizing detection signal.

FIG. 3b shows a difference between a field synchronizing period and a data period when the output signal of the absolute value operation unit 103 passes through the integrated unit 104. The segment having the smallest error after one field (313 segments) is temporarily selected as a field synchronizing signal. If the temporarily selected segment reaches a given reliability value, the field synchronizing signal is finally obtained. It should be understood that the segment synchronizing signal should essentially be locked in a portion where the field synchronizing signal is detected, so that it is possible to detect which one among input segments has a field synchronizing signal. In this case, two counters are required. One counter is a 832-counter for symbol counting while other counter is a 313-counter for segment counting.

FIGS. 4a to 4c show data, a segment synchronizing signal, and a field synchronizing signal when the synchronizing signals are locked. In this structure, a ghost signal becomes greater than a main signal in a case that a main path is temporarily blocked by movement of human being when receiving a digital TV signal of a VSB format through an internal antenna. In this case, the main signal is converted to a ghost signal. That is, since the greatest gain signal among input signals acts as the main signal in view of the digital TV receiver, previous synchronization related information is converted. Accordingly, the location of the synchronizing signals should be converted.

At this time, if it is determined that no reliability exists as the value of the reliability counter continues to decrease, a synchronizing signal for a new signal is obtained again. In this case, the synchronizing lock signal is released. Since the synchronizing lock signal is used as a reset signal of an equalizer, the equalizer is reset. A digital TV screen stands still during reset of the equalizer. This makes viewing of the digital TV difficult. Also, minimum two fields or more are required to detect a synchronizing signal in case that no reliability exists as the value of the reliability counter continues to decrease. This also makes viewing of the digital TV difficult.

SUMMARY OF THE INVENTION

Accordingly, the present invention is directed to an apparatus and method for detecting a synchronizing signal that substantially obviates one or more of the problems due to limitations and disadvantages of the related art.

An object of the present invention is to provide an apparatus and method for stably detecting a synchronizing signal at high speed in even case that a serious ghost exists.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an apparatus for detecting a synchronizing signal of a digital TV according to the present invention includes a correlation unit for obtaining a correlation value between a received signal for each unit of symbols and a preset reference field synchronizing signal, a maximum value detector for detecting a location of the symbol having a maximum correlation value while performing counting operation for a unit of a variable constant added to the number of symbols corresponding to one field, a synchronizing lock signal generator for generating a synchronizing lock signal by testing reliability of the symbol location detected by the maximum value detector, and a synchronizing location controller for calculating a relative location of the symbol location having a maximum value to generate a corresponding synchronizing signal if the synchronizing lock signal is generated by the synchronizing lock signal generator.

The correlation unit includes a finite impulse response (FIR) filter having even taps.

The correlation unit compares a sign of a field synchronizing signal value of a pattern equal to that inserted from a transmission party after setting the sign of the field synchronizing signal as a filter coefficient, with a sign of a received signal in each tap, adds the compared resultant values of each tap to one another, subtracts the added resultant value from an intermediate value if the added resultant value is smaller than the intermediate value, subtracts the intermediate value from the added resultant value if the added resultant value is greater than the intermediate value, and outputs a final resultant value as a correlation value.

The correlation unit further includes an absolute value operation unit for obtaining an absolute value of the output of the FIR filter.

The maximum value detector includes a correlation counter, and performs counting operation with a value obtained by subtracting the variable constant value from a total counting value if the location of the symbol having the maximum correlation value is detected.

The synchronizing lock signal generator includes a reliability counter, and increases a value of the reliability counter if a current maximum location is compared with a previous maximum location and they are in the same location, while activates the synchronizing lock signal if the value of the reliability counter is a constant value or greater.

The synchronizing lock signal generator substitutes a current location value for a previous location value if the current maximum location is different from the previous maximum location and the value of the reliability counter is '0'.

The synchronizing lock signal generator decreases the value of the reliability counter while maintaining the previous location value if the current maximum location is different from the previous maximum location and the value of the reliability counter is not '0'.

A method for detecting a synchronizing signal of a digital TV according to the present invention includes the steps of (a) obtaining a correlation value between a received signal for each unit of symbols and a preset reference field synchronizing signal, (b) detecting a location of the symbol having a maximum correlation value while performing counting operation for a unit of a variable constant added to the number of symbols corresponding to one field; (c) activating a synchronizing lock signal by testing reliability of the symbol location having the maximum correlation value; and (d) calculating a relative location of the location of the symbol having a maximum value through counting operation to respectively generate a segment synchronizing signal and a field synchronizing signal, if the synchronizing lock signal is activated.

In the preferred embodiment of the present invention, a variable counter is used so that the synchronizing signal is restored at high speed in even case that the synchronizing signal is varied due to serious channel distortion such as a case where a digital TV signal is received through an internal antenna.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
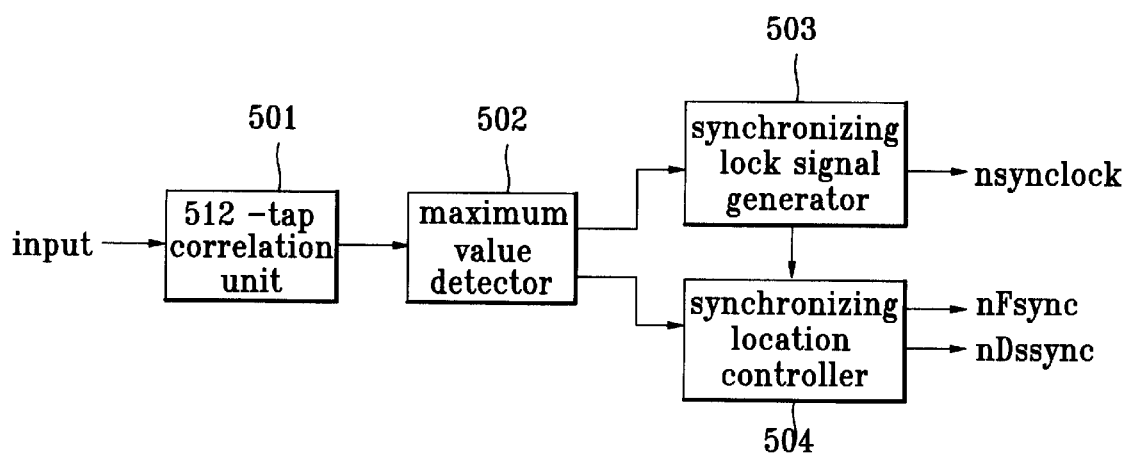
FIG. 5 is a block diagram of a synchronizing signal detector according to the present invention.

FIG. 5 is a block diagram of a synchronizing signal detector in a digital TV according to the present invention. Referring to FIG. 5, the synchronizing signal detector includes a correlation unit 501 for obtaining a correlation value between a received VSB signal and a reference field synchronizing signal, a maximum value detector 502 for detecting a location of a symbol having a maximum correlation value per field, a synchronizing lock signal generator 503 for preventing a wrong synchronizing signal from being detected, and a synchronizing location controller 504 for generating various synchronizing signals nFsync and nDssync if the synchronizing lock signal is generated by the synchronizing lock signal generator 503.

The aforementioned correlation unit 501 includes a 521-tap FIR filter. As an example, a coefficient of a PN511 sequence and a first symbol of a PN63 sequence are used as coefficients of the FIR filter. The number of taps of the FIR filter may be varied depending on designers. In the present invention, in order to reduce complexity of hardware, even numbered taps (for example, 512 taps) are provided.

The most significant bit (MSB) (sign bit) of a signal from which DC components are removed is only input to the correlation unit 501 per symbol. Accordingly, the correlation unit 501 outputs a sign correlation value among 512 symbols of the field synchronizing signal.

At this time, if a sign of an input signal is matched with a sign of a coefficient in each tap of the FIR filter, the correlation unit 501 outputs '1'. If not so, the correlation unit 501 outputs '0'. Therefore, the greater a value obtained by adding values of respective taps is, the higher the probability of the field synchronizing signal is. Furthermore, original polarity of the received signal may be converted due to characteristic of the VSB signal. Accordingly, in even case that a value obtained by adding values of respective taps is small, the probability of the field synchronizing signal is high. This is because that the sign of the input signal is not matched with the sign of the coefficient per tap in a field synchronizing signal period in case that the polarity of the received signal is converted.

In other words, the correlation value of the correlation unit 501 will be any one of 0~512. If the sign of the input signal of the FIR filter is matched with the sign of the coefficient, the correlation value has the greatest value (for example, 512). If not so, the correlation value has '0'. The correlation value '0' means that the polarity of the input signal is converted. Finally, it is likely that an intermediate value (for example, 256) between 0 and the greatest value (for example, 512) is not regarded as the field synchronizing signal.

Therefore, the correlation unit 501 obtains an absolute value of the resultant value of the FIR filter and then outputs the absolute value to the maximum value detector 502. This considers that the polarity of the field synchronizing signal may be converted.

At this time, if an absolute value for the output value of the FIR filter of the correlation unit 501 is obtained, a maximum value is obtained at the intermediate value '256' between '0' and '512'. In other words, if the correlation value is smaller than '256', the output of the correlation unit 501 is '256-correlation value'. If not so, the output of the correlation unit 501 is 'correlation value-256'.

The maximum value detector 502 compares all of correlation values output from the correlation unit 501 during one field, so as to detect the locations of the field synchronizing signal and a symbol having the greatest correlation value. The comparing operation for obtaining the maximum correlation value is performed in such a manner that counters as much as the number of symbols of one field are operated and then the location of the field synchronizing signal is detected from the location having the maximum value. That is, the correlation values between the VSB signal and the field synchronizing signal received per symbol within one field are compared with each other using counters and comparators that indicate the location of the symbols, so that the location of the symbol having the greatest correlation value is detected and output to the synchronizing lock signal generator 503 and the synchronizing location controller 504.

In this structure, if a ghost signal is greater than a main signal, the correlation value obtained in the main signal is obtained in the ghost signal. In other words, in view of the receiving party, a signal having the greatest gain is dominant regardless of the main signal or the ghost signal. Accordingly, the obtained location of the field synchronizing signal, i.e., a point having the maximum correlation value may be detected slowly or fast.

Figure 6A:
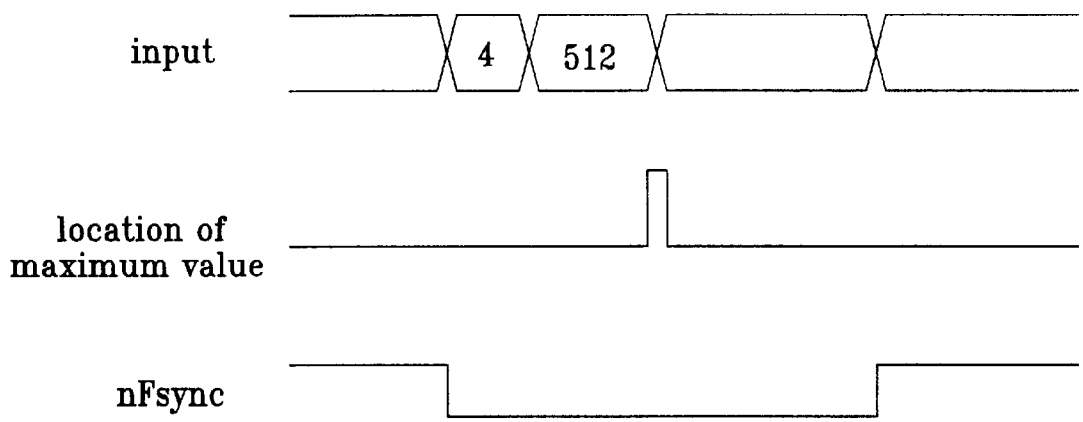
FIGS. 6a to 6c show examples of locations of synchronizing signals varied depending on a ghost signal.
Figure 6B:
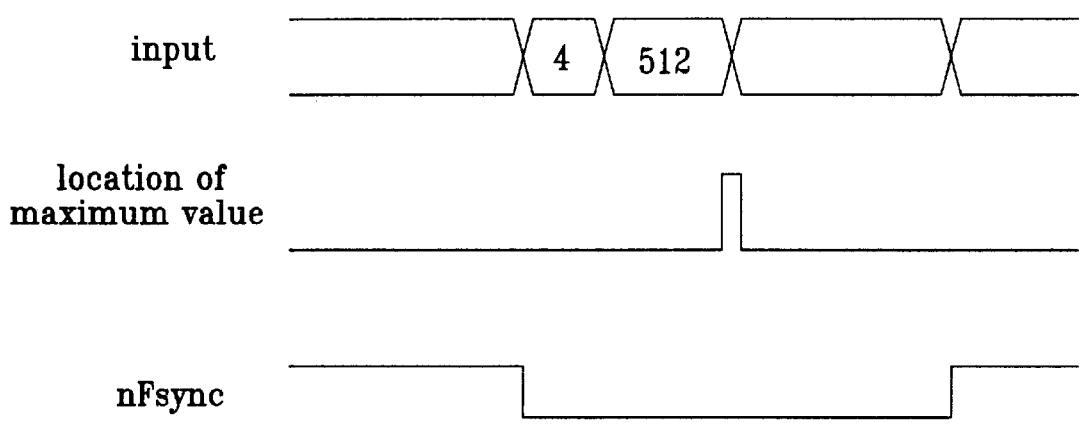
Figure 6C:
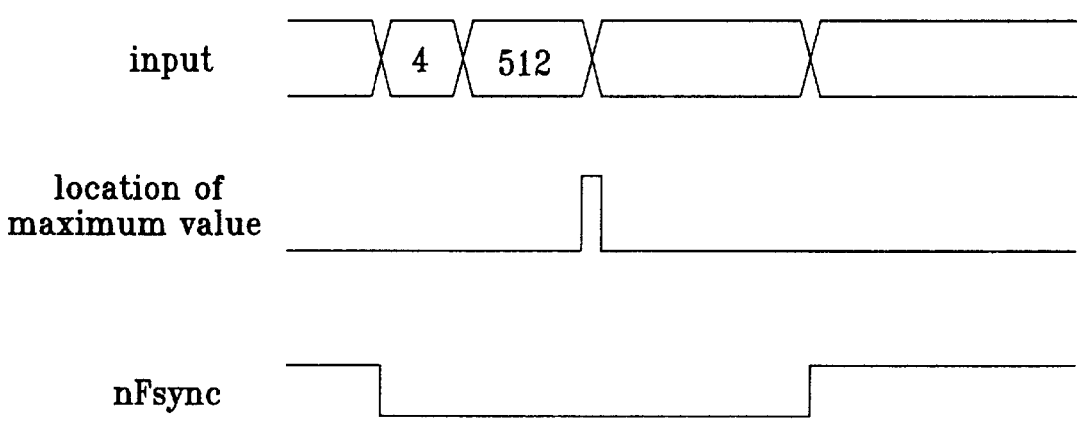

FIG. 6a shows a relation between data and a synchronizing signal in a normal state, FIG. 6b shows a case where the data and the synchronizing signal are detected slower than the normal state due to delay of the ghost signal, and FIG. 6c shows a case where the data and the synchronizing signal are detected faster than the normal state. The case of FIG. 6c occurs when the main signal has a greater gain as the ghost signal acts as the main signal.

At this time, as described above, it is assumed that when (a) is varied to (b) or when (a) is varied to (c), a correlation counter which checks the maximum value counts the symbols corresponding to one field. In this case, the synchronizing signal may not be restored within one field. If counting of the correlation counter starts at a symbol point of (4+512+4) within the field synchronization and a channel is varied in an intermediate portion (data period), for example, if the ghost signal acts as the main signal and delay of the ghost signal is 10 symbols, the location of the maximum value within one field cannot be identified by the correlation counter corresponding to one field. That is, not all of the 512 coefficients used for correlation are required.

Therefore, the correlation counter for detecting the location of the maximum value within one field is designed to perform counting as much as one field(832*313)+α symbols, wherein α should be $$0 < \alpha < \frac{316}{2}$$

(that is, 316=832−(4+512)). Meanwhile, in case of α≧158, some problems may occur when a channel environment on which the ghost signal acts greater than main signal is varied to a channel environment on which the main signal acts greater than ghost signal. That is to say, the synchronizing signal may not be detected in the main signal. Here, ac means a watch point, and a maximum location value is obtained within the watch point to calculate a time when the field synchronizing signal is transited to high as shown in FIGS. 6a to 6c.

In other words, the correlation counter of the maximum value detector 502 and the reliability counter of the synchronizing lock signal generator 503 are controlled again. The synchronizing lock signal generator 503 compares the current maximum location value with the previous maximum location value. If the current maximum location value is equal to the previous maximum location value, the synchronizing lock signal generator 503 increases the value of the reliability counter by one. If the current maximum location value is different from the previous maximum location value and the value of the reliability counter is '0', the synchronizing signal lock generator 503 substitutes the current location value for the previous location value. Also, if the current maximum location value is different from the previous maximum location value and the value of the reliability counter is not '0', the synchronizing signal lock generator 503 decreases the value of the reliability counter while maintaining the previous location value. At this time, if the value of the reliability counter is '1' or greater, the synchronizing signal lock generator 503 activates the synchronizing lock signal nsynclock at low level.

If the correlation value at the maximum location is greater than the threshold value, the value of the correlation counter of the maximum value detector 502 moves to 'the number of total counting-maximum location'. That is, since counting is performed in such a manner that ax is added to the number of symbols corresponding to one field, counting is performed with a value obtained by subtracting a from the counting value of the correlation counter. In this case, reset locations of the counter within the field become equal.

Figure 1:
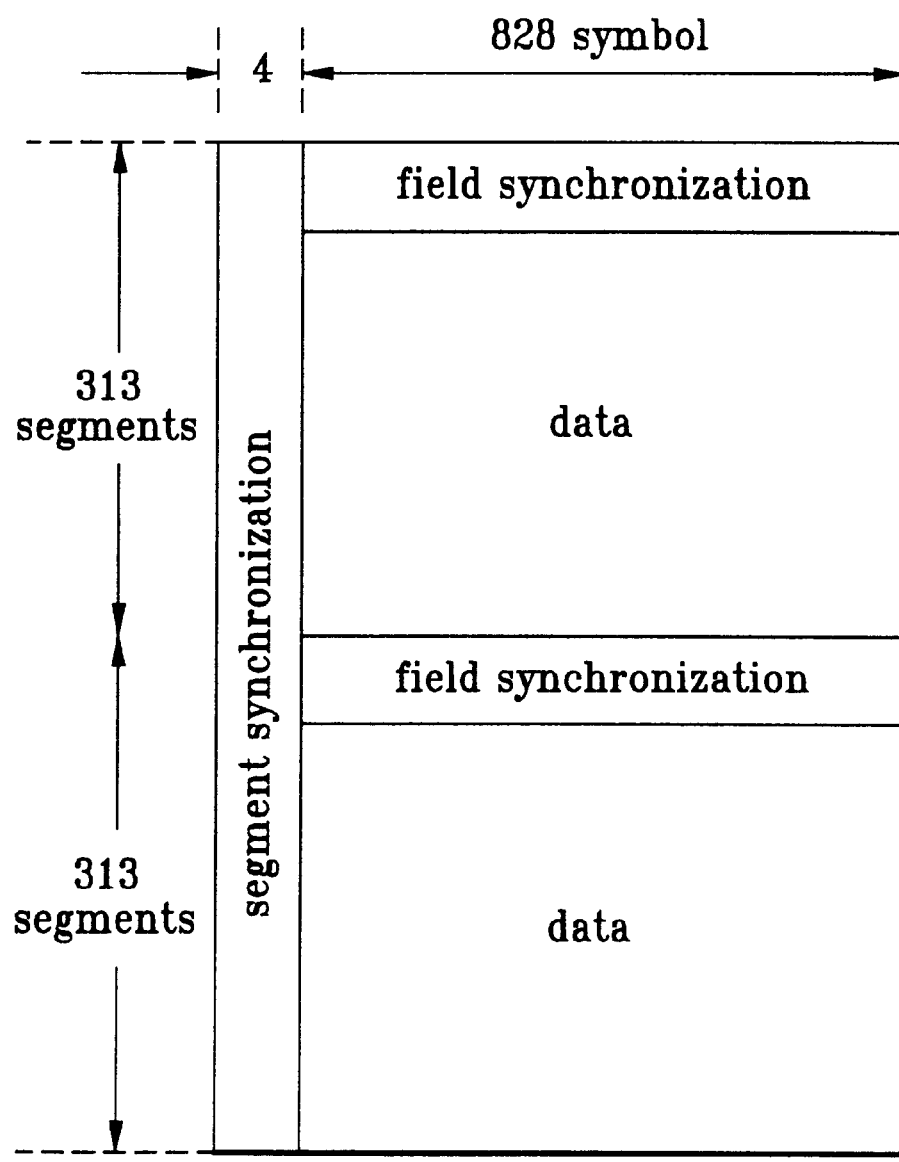
FIG. 1 shows a data frame format of a general digital TV.
Figure 2:
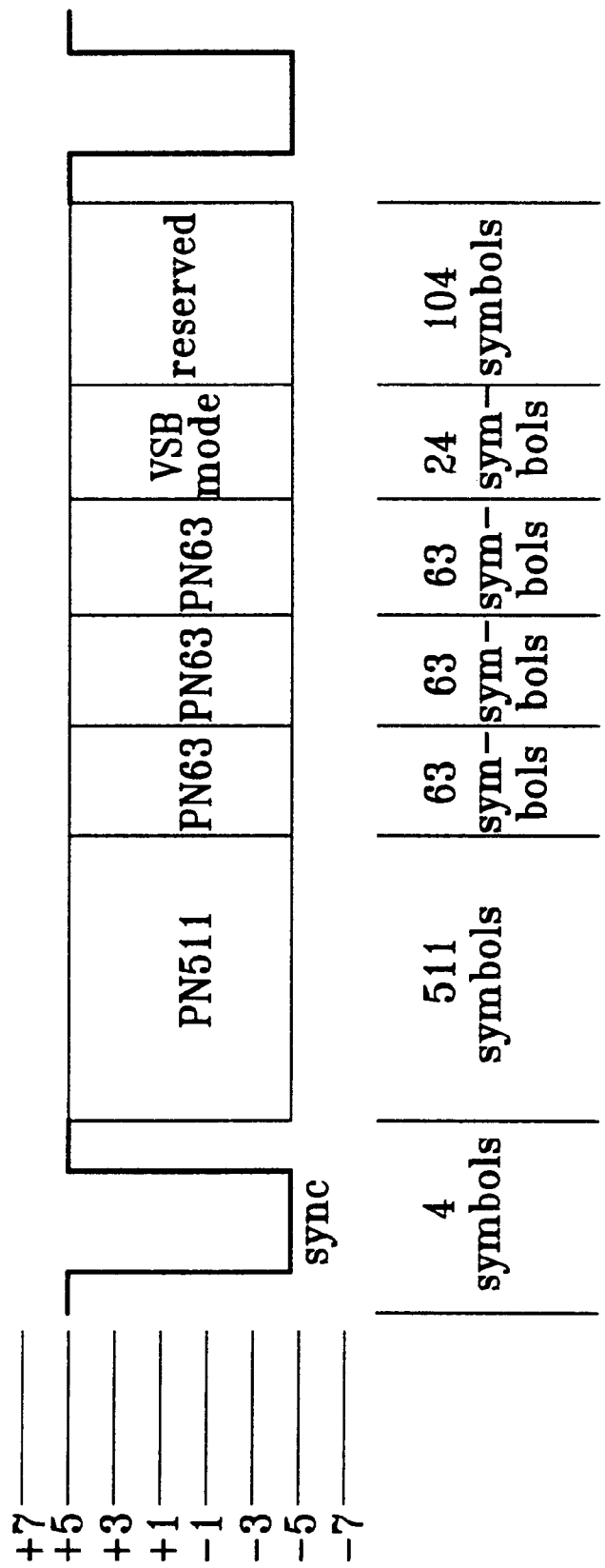
FIG. 2 shows a configuration of a field synchronizing signal of FIG. 1.
Figure 3A:
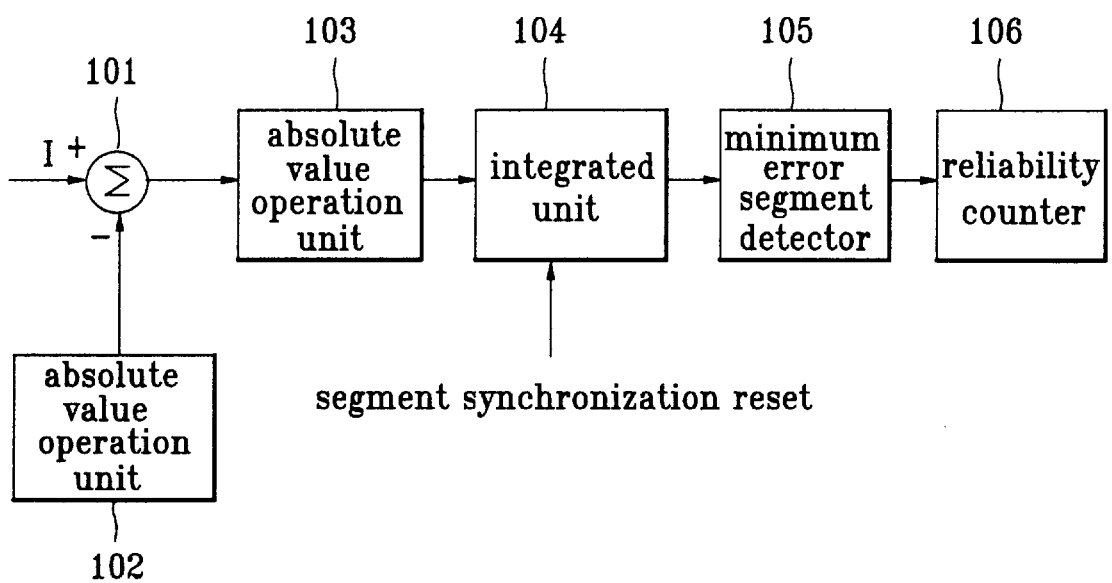
FIG. 3a is a block diagram of a related art field synchronizing signal detector.
Figure 3B:
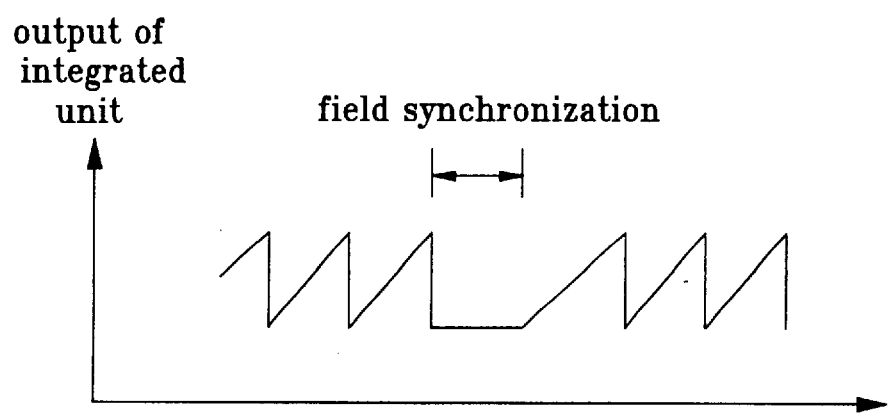
FIG. 3b shows a relation between an output of an integrated unit of FIG. 3a and a field synchronizing signal.
Figure 4A:
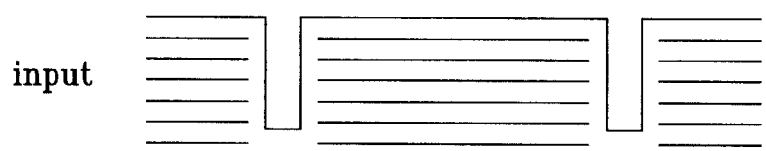
FIGS. 4a to 4c show relations among an input signal, a segment synchronizing signal, and a field synchronizing signal.
Figure 4B:
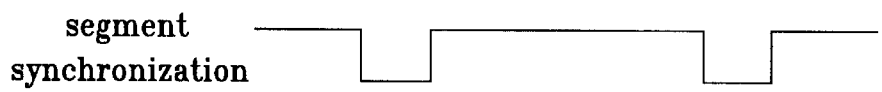
Figure 4C:
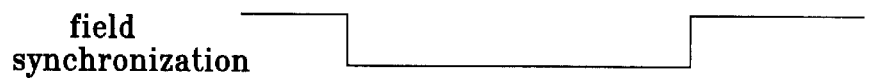

Meanwhile, the synchronizing signal controller 504 calculates the location of the field synchronizing signal from the location of the symbol having the maximum correlation value identified by the maximum value detector 502 using the counter to match the VSB transmission format of FIG. 1, if the synchronizing lock signal nsynchlock is transited to active low level in the synchronizing lock signal generator 503, so that the field synchronizing signal nFsync is generated. At this time, since the low point of the field synchronizing signal is not initially detected, its high point is first obtained and then the low point is obtained by counting.

Since a transmission signal frame structure of FIG. 1 is standardized, the location of the segment synchronizing signal can easily be detected by means of a relative location from the detected field synchronizing signal using the counter only without a separate segment synchronizing signal detector. That is, if the synchronizing lock signal nsynclock is transited to active low level in the synchronizing lock signal generator 503, the location of the segment synchronizing signal is calculated from the location of the symbol having the maximum correlation value identified by the maximum value detector 502 using the counter to match the VSB transmission format of FIG. 1, so that the segment synchronizing signal is generated.

By doing so, the synchronizing pattern is traced per field to restore the synchronizing signals in even case that the channel characteristic is seriously varied. Also, as shown in FIG. 6, if α is set too greatly when the ghost signal is varied to the main signal, the field synchronizing signal is not transited to high level at the watch point. In this case, the data does not match the field synchronizing signal, thereby destroying the data at the FEC block. Accordingly, in the present invention, the value of α that determines the range of the variable counter is set at 156 to detect the synchronizing signal in the ghost signal having symbol delay of ±156.

As aforementioned, the apparatus and method for detecting a synchronizing signal of a digital TV according to the present invention has the following advantages.

The synchronizing pattern is traced per field with a simple system in even case that the channel characteristic is seriously varied. Thus, the synchronizing signals are stably restored at high speed. Particularly, when receiving the digital TV signal of the VSB format through an internal antenna, excellent receiving performance can be obtained.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An apparatus for detecting a synchronizing signal of a digital TV which detects a synchronizing signal inserted from a transmission party, the apparatus comprising:
   a correlation unit for obtaining a correlation value between a received signal for each unit of symbols and a preset reference field synchronizing signal;
   a maximum value detector for detecting a location of the symbol having a maximum correlation value while performing counting operation for a unit of a variable constant added to the number of symbols corresponding to one field;
   a synchronizing lock signal generator for generating a synchronizing lock signal by testing reliability of the symbol location detected by the maximum value detector; and
   a synchronizing location controller for calculating a relative location of the symbol location having a maximum value to generate a corresponding synchronizing signal if the synchronizing lock signal is generated by the synchronizing lock signal generator.

2. The apparatus of claim 1, wherein the correlation unit includes a finite impulse response (FIR) filter having even taps.

3. The apparatus of claim 2, wherein the correlation unit includes a 512-tap FIR filter.

4. The apparatus of claim 3, wherein the FIR filter uses a sign of a PN511 sequence and a sign of a first symbol of a PN63 sequence as coefficients of 512-taps.

5. The apparatus of claim 2, wherein the correlation unit receives a sign bit only, per symbol, of a signal from which DC components are removed.

6. The apparatus of claim 2, wherein the correlation unit outputs '1' if a sign of an input signal is matched with a sign of a coefficient in each tap of the FIR filter, while the correlation unit outputs '0' if not so.

7. The apparatus of claim 2, wherein the correlation unit compares a sign of a field synchronizing signal value of a pattern equal to that inserted from a transmission party after setting the sign of the field synchronizing signal as a filter coefficient, with a sign of a received signal in each tap, adds the compared resultant values of each tap to one another, subtracts the added resultant value from an intermediate value if the added resultant value is smaller than the intermediate value, subtracts the intermediate value from the added resultant value if the added resultant value is greater than the intermediate value, and outputs a final resultant value as a correlation value.

8. The apparatus of claim 2, wherein the correlation unit further includes an absolute value operation unit for obtaining an absolute value of the output of the FIR filter.

9. The apparatus of claim 1, wherein the variable constant value of the maximum value detector is set below 156.

10. The apparatus of claim 1, wherein the maximum value detector includes a correlation counter, and performs counting operation with a value obtained by subtracting the variable constant value from a total counting value if the location of the symbol having the maximum correlation value is detected.

11. The apparatus of claim 10, wherein the value of the correlation counter moves to 'the number of total counting-maximum location' if the correlation value at the maximum location is greater than a preset threshold value.

12. The apparatus of claim 1, wherein the synchronizing lock signal generator includes a reliability counter, and increases a value of the reliability counter if a current maximum location is compared with a previous maximum location and they are in the same location, while activates the synchronizing lock signal if the value of the reliability counter is a constant value or greater.

13. The apparatus of claim 12, wherein the synchronizing lock signal generator substitutes a current location value for a previous location value if the current maximum location is different from the previous maximum location and the value of the reliability counter is '0'.

14. The apparatus of claim 12, wherein the synchronizing lock signal generator decreases the value of the reliability counter while maintaining the previous location value if the current maximum location is different from the previous maximum location and the value of the reliability counter is not '0'.

15. The apparatus of claim 1, wherein the synchronizing location controller includes a counter, and calculates the location of the field synchronizing signal from the location of the symbol having the maximum correlation value identified by the maximum value detector using the counter to generate the field synchronizing signal if the synchronizing lock signal is generated by the synchronizing lock signal generator.

16. The apparatus of claim 1, wherein the synchronizing location controller includes a counter, and calculates a location of a segment synchronizing signal from the location of the symbol having the maximum correlation value identified by the maximum value detector using the counter to generate the segment synchronizing signal if the synchronizing lock signal is generated by the synchronizing lock signal generator.

17. A method for detecting a synchronizing signal of a digital TV comprising the steps of:
(a) obtaining a correlation value between a received signal for each unit of symbols and a preset reference field synchronizing signal;
(b) detecting a location of the symbol having a maximum correlation value while performing counting operation for a unit of a variable constant added to the number of symbols corresponding to one field;
(c) activating a synchronizing lock signal by testing reliability of the symbol location having the maximum correlation value; and
(d) calculating a relative location of the location of the symbol having a maximum value through counting operation to respectively generate a segment synchronizing signal and a field synchronizing signal, if the synchronizing lock signal is activated.

18. The method of claim 17, wherein the step (a) includes the steps of comparing a sign of a field synchronizing signal value of a pattern equal to that inserted from a transmission party after setting the sign of the field synchronizing signal as a filter coefficient, with a symbol of a received signal in each tap, adding the compared resultant values of each tap to one another, subtracting the added resultant value from an intermediate value if the added resultant value is smaller than the intermediate value, subtracting the intermediate value from the added resultant value if the added resultant value is greater than the intermediate value, and outputting a final resultant value as a correlation value.

19. The method of claim 17, wherein the variable constant in the step (b) is set below 156.

20. The method of claim 17, wherein the step (b) continues to perform counting operation after varying the number of counting to a value obtained by subtracting the variable constant value from a total counting value if the location of the symbol having the maximum correlation value is detected.

* * * * *